Oct. 18, 1949.  L. B. CORNWELL  2,485,432
MAGNETIC PHONOGRAPH PICKUP
Filed Nov. 28, 1945  5 Sheets-Sheet 1
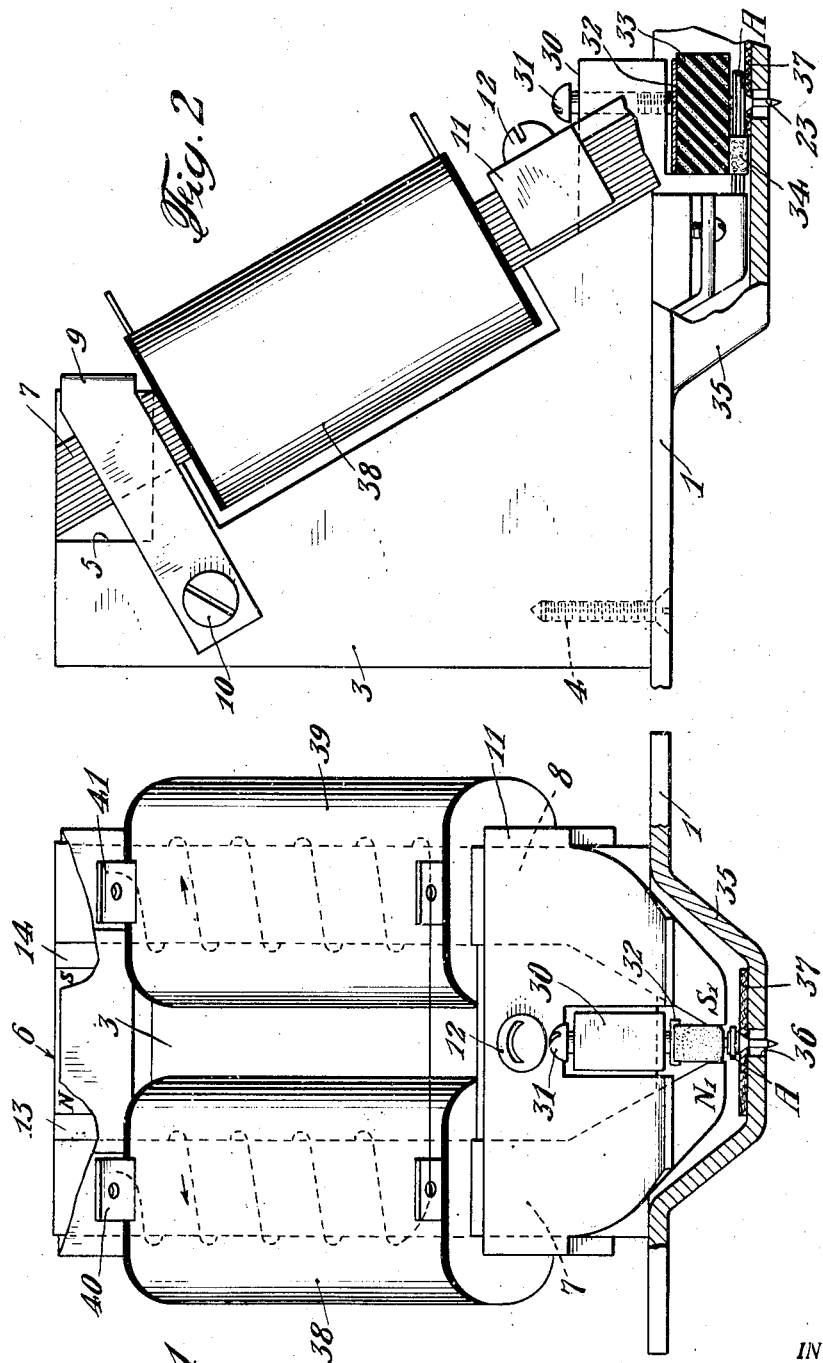
INVENTOR
Lionel B. Cornwell
BY
Ward Crosby & Neal
his ATTORNEYS Oct. 18, 1949. L. B. CORNWELL 2,485,432
MAGNETIC PHONOGRAPH PICKUP
Filed Nov. 28, 1945 5 Sheets-Sheet 2
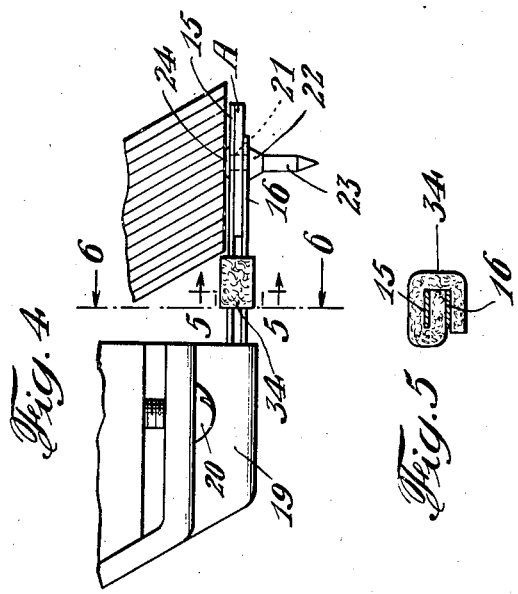
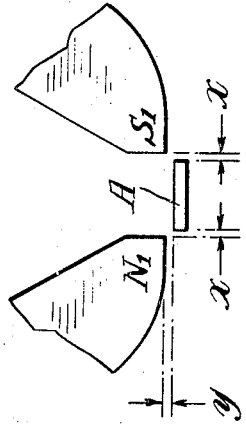
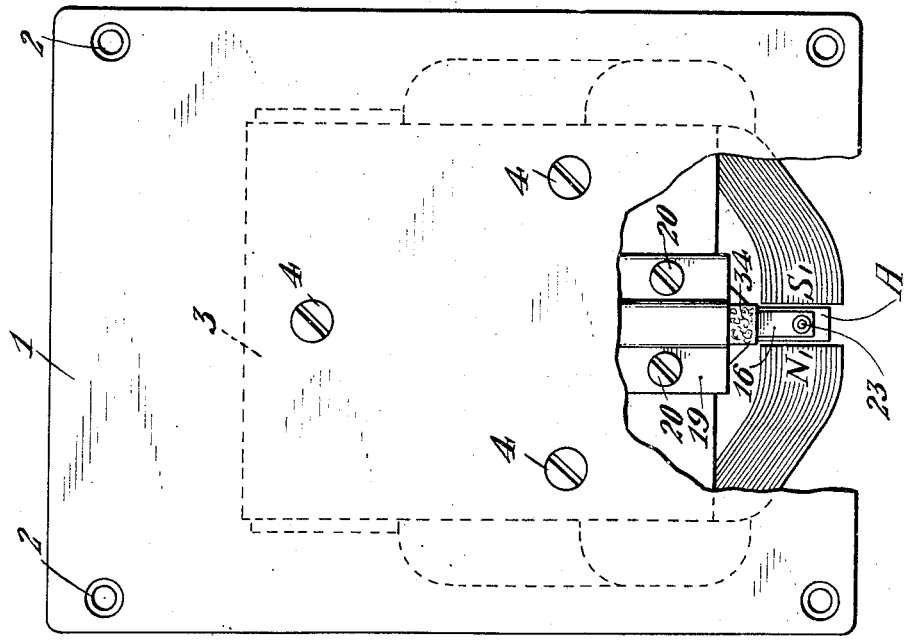
INVENTOR
Lionel B. Cornwell
BY
his ATTORNEYS

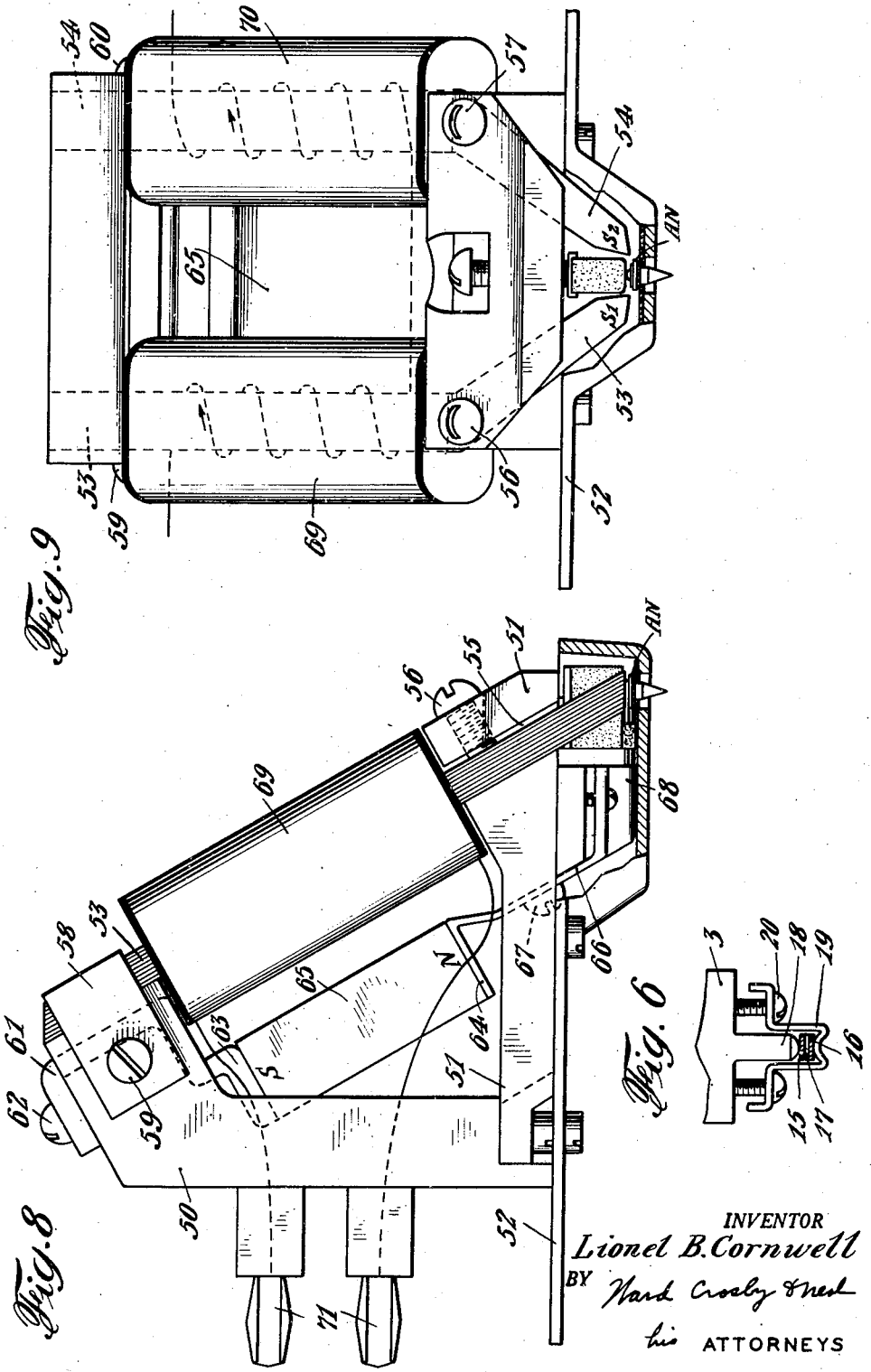

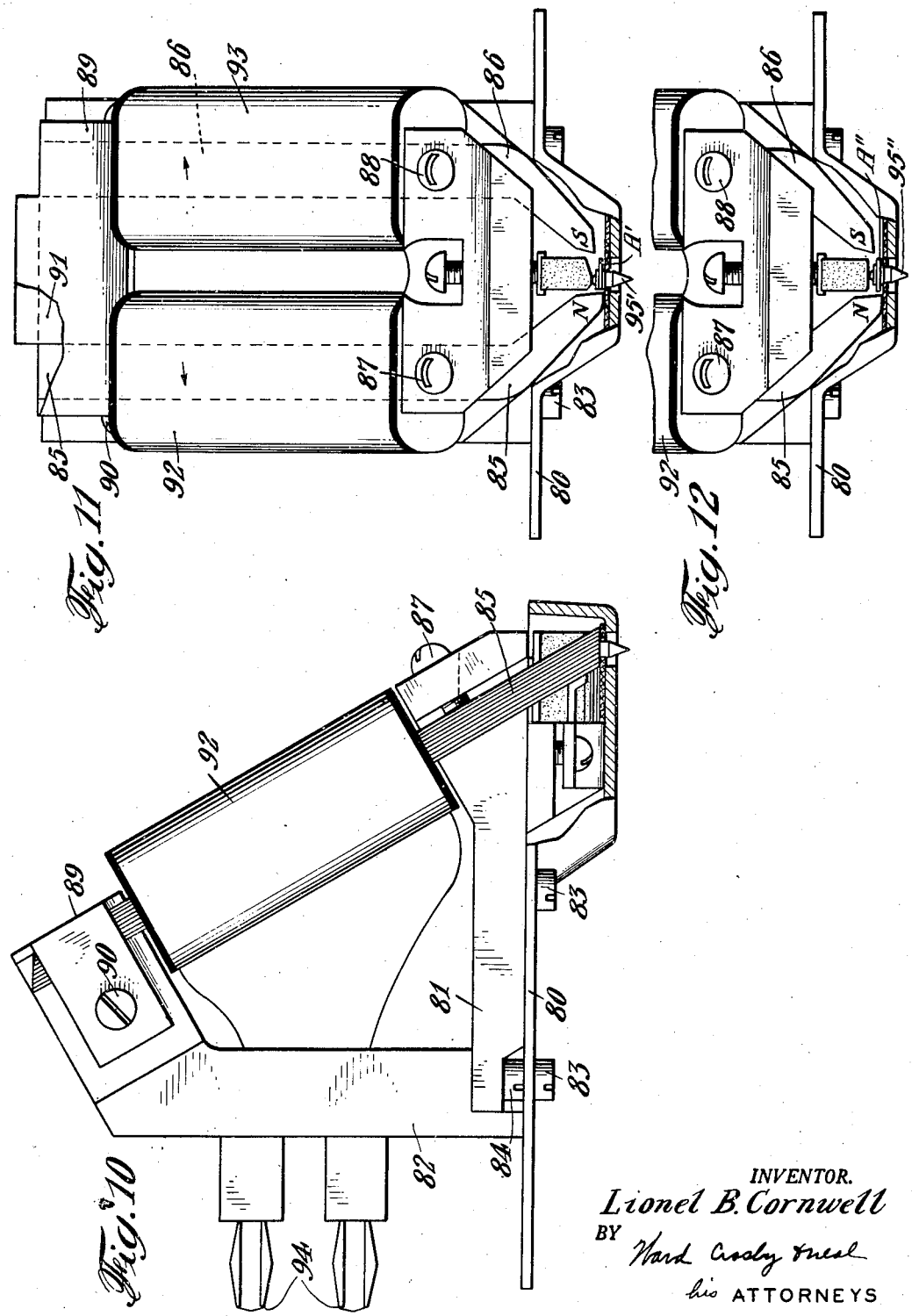

Oct. 18, 1949.  L. B. CORNWELL  2,485,432
MAGNETIC PHONOGRAPH PICKUP
Filed Nov. 28, 1945  5 Sheets-Sheet 5
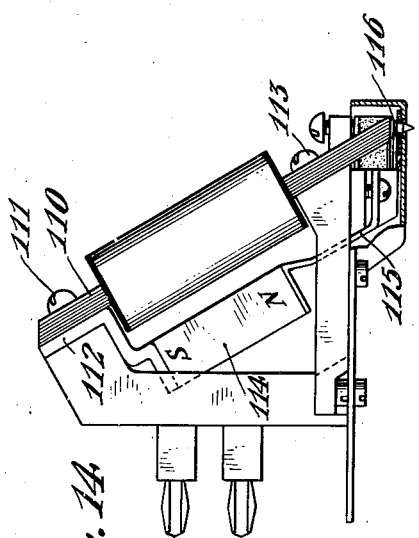
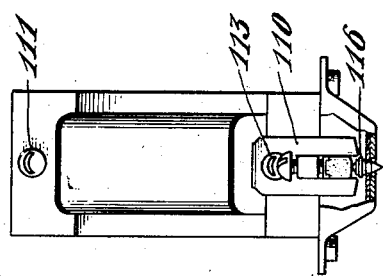
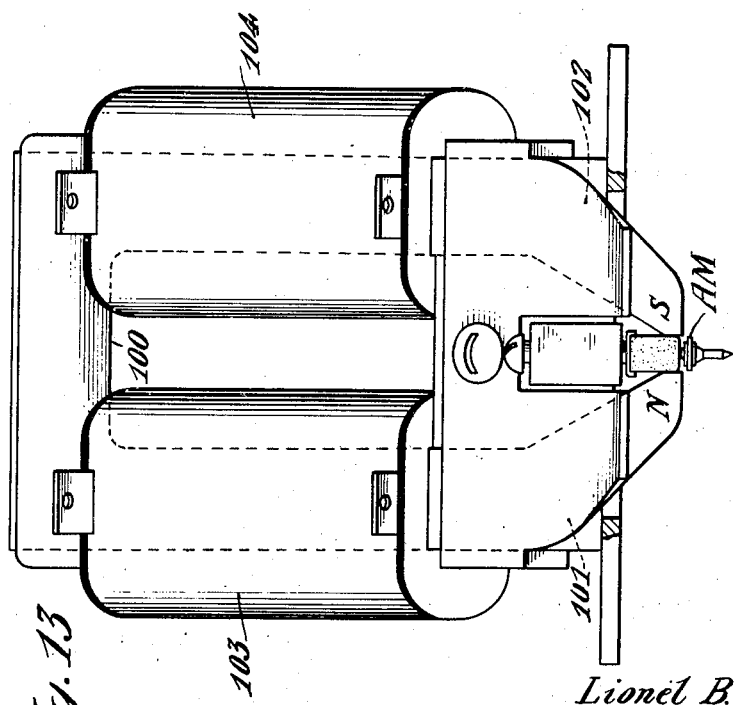
INVENTOR
Lionel B. Cornwell
BY Ward Crosby Ireal
his ATTORNEYS Patented Oct. 18, 1949

2,485,432

UNITED STATES PATENT OFFICE 2,485,432

MAGNETIC PHONOGRAPH PICKUP

Lionel B. Cornwell, New Canaan, Conn.

Application November 28, 1945, Serial No. 631,404

22 Claims. (Cl. 179—100.41)

This invention relates to electrical sound translating devices of the so-called magnetic type. The invention is useful in translating mechanical motion into electrical impulses, as in a reproducer, or vice versa, as in a recorder.

While the invention is adapted for various uses, its embodiment in a pick-up device will be more particularly described herein by way of example sufficient to enable those skilled in the art to practice the invention.

An object of the invention is to provide an improved device of simple construction and adapted to volume production.

Another object of the invention is to provide a device which is capable of manufacture at a relatively small cost and which at the same time is capable of fidelity of performance over substantially the full range of audible frequencies utilized in phonograph sound records.

The invention consists of the novel features, arrangements, construction and combination of parts embodied, by way of example, in the apparatus to be hereinafter more fully described as illustrating a present preferred form of the invention, and the invention will be more particularly pointed out in the appended claims.

Further and more specific objects, features and advantages of the invention will more clearly appear from the detailed description to be given following, taken in connection with the accompanying drawings in which:

Fig. 1 is a front elevational view of one embodiment of the invention, shown on an enlarged scale (approximately 3:1), with certain parts broken away to better show the structure, Fig. 2 is a side elevational view of the device shown in Fig. 1, Fig. 3 is a bottom plan view of the device shown in Figs. 1 and 2, Fig. 4 is a somewhat further enlarged fragmentary elevational view of certain parts shown in Figs. 1, 2 and 3, Fig. 5 is a sectional view taken as designated by the line 5—5 of Fig. 4, Fig. 6 is a sectional view taken as designated by the line 6—6 of Fig. 4, but on the same scale as Figs. 1–3, Fig. 7 is a somewhat diagrammatic view showing the relationship of certain parts of the preceding figures, Figs. 8 and 9 are side and front elevational views, respectively, illustrating certain modifications applicable to the devices shown in Figs. 1–7 and 10–12.

Figs. 10 and 11 are side and front elevational views, respectively, illustrating a modified form of the invention, Fig. 12 is a front elevational view showing a modification of certain features of the device shown in Fig. 11, Fig. 13 is a front elevational view illustrating certain modifications applicable to the embodiments shown in Figs. 1–7 and 10–12, both inclusive, and Figs. 14 and 15 are side and front elevational views, respectively, showing certain modifications of the device illustrated in Figs. 8 and 9.

In general my invention contemplates an armature resiliently supported for vertical movement in the flux path of a magnetic circuit and so positioned with respect to pole pieces that the modulation of the flux is caused by (as in a reproducer) or causes (as in a recorder) variations only in the air gap distance of the armature from one or more of the pole pieces while effecting no variation whatsoever in any area of coupling between the armature and pole pieces. The invention further contemplates a cumulative effect of the flexure of the resilient mounting of the armature by the combined forces due to the unbalanced weight of the device and the magnetic pull of the armature toward the pole pieces.

Referring more particularly to Figs. 1–7: a base plate 1 serves as a mount for the several component parts and provides a means of attaching the device to a suitable support or arm (not shown), as by means of screws passing through the holes 2 (Fig. 3). A frame block 3 (Figs. 2, 1 and 3), made of aluminum or other suitable non-magnetic material, is fastened to the upper side of plate 1 as by screws 4. The upper portion of the block 3 is provided with a notch 5 (Fig. 2) in which is seated a permanent magnet 6 whose pole ends are designated N and S. A pair of pole pieces 7—8, made of laminated transformer-iron, extend rearwardly and upwardly in laterally spaced parallel relationship and are clamped to the face of said block 3 by means of an upper clamp 9 secured to the block by screws such as 10 and a lower clamp 11, secured to the block by a screw 12. The upper ends of the pole pieces 7 and 8 are in magnetic connection with the poles N and S, preferably through the intermediary of soft iron filler blocks 13 and 14 (Fig. 1). The lower ends of the pole pieces 7—8 are inclined downwardly and inwardly and terminate in pole ends $N_1$ and $S_1$, whose inner faces are spaced apart a fixed horizontal distance to provide an armature gap for a cooperating armature A (see particularly Fig. 7).

The armature is operatively supported between the outer ends of two flat ribbon springs 15—16 (Fig. 4), whose rear ends are separated by a spacer 17 (Fig. 6) of the same thickness as the armature A, to maintain the springs in parallelism; and are rigidly clamped against a strut 18, which depends from and is integral with the block 3, by means of a clamp 19 and screws 20. It will be noted that the cooperating faces of the strut 18 and clamp 19 are provided with convex ridges to facilitate torsional movement of the springs 15—16. The armature is rigidly secured in place between the spring ends, in the present embodiment by a reduced shank 21 integral with and extending upwardly from a head 22 provided on a stylus 23 and riveted over as at 24. The springs 15—16 and the manner of attachment allow easy flexing for vertical motion of the armature but present relatively infinite resistance against the armature or adjacent portion of spring 15 being pulled to either side into contact with the pole ends $N_1$ or $S_1$. The slight lateral motion of the stylus tip, due to such ancillary lateral variations as might be present in a vertical cut record groove, or otherwise, is provided for by torsional motion referred to above; it being noted that in this embodiment (Figs. 1–3) for vertical cut records this lateral movement of the stylus is considerably less than in the embodiments to be hereinafter described.

The magnetic pull of the armature A toward the pole ends $N_1$—$S_1$ supplements the force of gravity resulting from the unbalanced weight of the device in opposition to the force of the springs 15—16 which tend to urge the armature away from the pole ends. The springs 15—16 are so constructed and arranged that when the device is in operative position with the stylus 23 resting on a record the armature A is spaced downwardly (Fig. 7) below and in parallelism with a horizontal plane defining the extreme ends of the pole pieces $N_1$—$S_1$ a vertical distance designated $y$ which is greater than the maximum operative travel of said armature toward said pole ends. The pair of parallel springs 15—16 and the manner of mounting serves to maintain the armature parallel to the lower faces of the pole ends $N_1$—$S_1$ throughout the operating range. I have found that with present vertical cut records the distance $y$ should not be less than .001" and should not exceed .008" for useful purposes. Preferably I employ a distance $y$ of .005". This spacing is provided for by setting the springs 15—16 so that before the device is in operative position the armature will be positioned outwardly a slight distance beyond the operative distance $y$. With the springs under load of the device they are flexed toward the pole pieces and the magnetic pull of the pole pieces adds an additional force urging the armature toward the pole pieces and therefore adds to the load on the springs. This results in increased flexing load on the springs without increasing the weight on the stylus and is a beneficial feature of the invention. The magnetic pull being considerably less than the force exerted by the spring does not prevent the proper functioning of the latter.

The maximum width of the armature A is less than the lateral distance between the inner faces of the pole ends $N_1$—$S_1$ and the armature is centered laterally with respect to said pole ends so as to provide clearance designated $x$ between said armature and respective pole ends should the armature be accidentally displaced beyond its operative limits, such as by dropping the device on the stylus through carelessness in placing it in position on a record. I have found that the distance $x$ may and should be small for best results, and I have obtained excellent results using a clearance $x$ of the order of .0005" to .001"; and my present experience indicates that in certain embodiments it is possible to get useful results with a clearance $x$ of the order of .004, but at a sacrifice in performance.

To assure a most precise setting of the vertical spacing, which is of considerable importance, I have provided a gap adjustment means which will now be described with reference to Figs. 1 and 2. A part of the rigid frame structure, such as the forwardly projecting portion 30 of the block 3 is disposed between the pole pieces 7—8 and over the armature A and is tapped to receive an adjustment screw 31 whose lower end is in engagement with a plate 32 which rests on and is preferably cemented or bonded to a soft felt or rubber block 33 whose lower surface is slightly rounded transversely and engages the head 24 (see also Fig. 4) of the stylus 23 which is rigidly attached to the armature A. I have found that in using an adjusting screw 31 size #1 72 threads per inch a ¼ turn gives an output level difference of three decibels without noticeably reducing the fidelity. I have also found it advantageous to insert a strip of soft felt (Figs. 2, 4 and 5) 34, of a thickness of approximately the same as that of the armature A or a few thousandths thicker, around and between the springs 15—16. The plate 1 is provided with a downwardly extending depression 35 to enclose the pole piece ends, armature A and mounting therefor (Fig. 1) and has a hole 36 through which the stylus 23 freely extends. A piece of soft felt 37 is disposed within the depression 35 surrounding the head of stylus 23 to seal the opening 36 against dust and other foreign matter.

*Operation*

It will be seen from the foregoing that as the stylus 23 rides in the sound groove of a vertical cut record it will be moved up and down transforming the undulations into mechanical motion of the armature A, which being in the magnetic circuit modulates the magnetic field that exists between the pole piece ends $N_1$—$S_1$ and passes through the armature A: it being particularly noted at this point that the flux flow through the armature A is unidirectional at all times, with material resultant advantages well understood to those skilled in this art. Two coils 38 and 39 (Figs. 1 and 2), preferably of identical dimensions, number of turns and impedance, are wound in relatively opposite directions around the respective pole pieces 7 and 8, as indicated diagrammatically, and serve to transform the magnetic fluctuations into corresponding alternating electrical potentials as follows:

Assuming a vertical vibratory force is applied, the following magnetic and consequent electrical reaction takes place. The armature A moves upward toward poles $N_1$ and $S_1$, increasing the flux through arms 7 and 8, inducing an electrical potential in coils 38 and 39. When the armature A moves down, the reversal of the flux action takes place, inducing a potential of opposite polarity in the coils completing the full alternation. By connecting the coils in series boosting, they give double the voltage of either single coil. The coils are provided with suitable terminals 40 and 41 for connection to a suitable receiving amplifier in the usual manner.

The coils are in phase for the flux changes produced by the vertical motion of the armature A but are 180° out of phase to the external magnetic field that may be produced by an adjacent transformer or motor as well as by ancillary latent motion of the stylus 23. Thus allowing full sensitivity to the vibratile motions of the armature while simultaneously bucking all hum that would otherwise be picked up from external magnetic fields or ancillary latent vibrations.

A single coil may be used, and said coil may be located on any of the two poles with equal results as far as vibratory reproduction is concerned, but the "Hum bucking characteristic" is lost. Two coils also raise the efficiency of the pickup, therefore a two coil assembly is to be preferred.

To avoid the distortion of the shape of any given alternation, it is necessary that the maximum quantity of flux flowing through the armature A never exceed the straight line portion of the hysteresis loop of the type of metal used in the armature. After selecting the type of iron that will permit the highest flux density possible, maximum output thereafter depends upon how much iron can be used without impairing the fidelity of reproduction through excessive mass.

Referring to Fig. 1, it is evident that when the armature A moves in a vertical direction, flux variation takes place in poles $N_1$ and $S_1$ as the air gap between these said poles and the armature is altered.

Further reduction of weight in the armature is effected by the appreciation of the fact that the efficiency is not substantially influenced by how long or short the distance from $N_1$ to $S_1$ may be. It is therefore desirable to make the width of the armature as short as possible. I have found that excellent results are obtained, for example, with an armature A of the order of .014 thickness, .062 width in a lateral direction and .156" in length from back to front.

As previously pointed out the pressure on the record is of the order of from 30 to 35 grams, which, as supplemented by the magnetic pull exerted on the armature, brings the armature A into the operative position above described and places the resilient mounting under the desired tension to overcome the inertia of the armature and stylus when vibrating vertically through the complete range of amplitudes provided on vertical recording (say 30 to 15,000). The felt pad 33, in addition to its function as a means of adjusting the vertical gap, serves to dissipate excess vibratory energy that might otherwise produce a non-linear response characteristic over the desired audio range.

*Modification as to polarity*

Figs. 8 and 9 illustrate an embodiment of the the invention showing how by employing pole piece ends of like polarity the invention may be used for either vertical or lateral cut records. In the main the parts are constructed and arranged as previously described and accordingly only the differences will be particularly pointed out following.

In this embodiment for convenience the non-magnetic frame block is made in two pieces 50—51, rigidly secured together and to a base plate 52. The lower ends of pole pieces 53 and 54 are disposed in slots such as 55 formed in the block portion 51 and are rigidly secured in place by screws 56—57; the upper ends are rigidly secured to the upper end of block 50 by a clamp 58 and screws 59—60. The upper ends of the pole pieces 53—54 are held in intimate, magnetic contact with a bracket 61 made of magnetic material and rigidly secured to the block 50 by screws such as 62. The bracket 61 is provided with a lower jaw 63 between which and a cooperating jaw 64 is clamped a permanent magnet 65, providing the pole ends indicated as S and N. The jaw 64 is formed as a part of a bracket 66 which is rigidly secured to the block 51 as by screws 67 and provides at its lower end a clamp portion 68 similar in structure and function to the clamp 19 (shown in Fig. 6). An armature AN is positioned and supported in all particulars as previously described. However, in this embodiment the armature forms the north pole of the magnetic flux path, being connected to the end N of magnet 65 by means of the supporting springs and the bracket 66, and the pole pieces 53—54 being connected to the end S of magnet 65 providing a pair of south ends of the flux path designated $S_1$—$S_2$. Coils 69—70 surround the respective pole pieces 53—54 and are connected to suitable plug terminals such as 71 for plugging into a suitable circuit. The operation of this device for either vertical cut or lateral cut records will now be described.

For reproduction of vertical cut records: as the armature AN moves toward or away from the poles, the flux increases or decreases respectively simultaneously in both poles, and with the coils so connected to be in phase they will generate a potential accordingly; but will reject all laterally induced fluctuations, because when the armature AN is rocked by lateral motion of the stylus due to any ancillary vibrations caused by the vertical cut record, the fluxes will rise in one pole while falling in the other, thereby bucking out extraneous disturbances.

For reproducing lateral cut records: the leads of one coil are the reverse in relation to the other, and as will be obvious from the foregoing, the coils will be in phase to generate a potential from lateral motions of the stylus and reject all flux variations due to ancillary vertical motion of the stylus.

I have found that by a modification of the pole piece ends of opposite polarity, as in Fig. 1, and a somewhat altered disposition of the armature relative thereto the device is adapted not only for use with vertical cut records but also for lateral cut records. An embodiment of the invention showing these features is illustrated in Figs. 10–11 and will now be described.

In this embodiment the supporting frame is quite similar to that of Figs. 8 and 9, and comprises a base plate 80 and frame blocks 81—82 rigidly secured thereto by screws such as 83 and the blocks are secured together by screws such as 84; a pair of pole pieces 85—86 have their lower ends secured to the block 81 as by screws 87—88 and their upper ends to the block 82 as by a clamp 89 and screws such as 90 in the manner described relative to Figs. 8–9. A permanent magnet 91 is firmly held between the upper ends of pole pieces 85—86 and against the block 82 by the clamp 89 with its north end polarizing the pole piece 85 and its south end polarizing the pole piece 86, the lower terminal ends of the pole pieces being correspondingly designated N and S. Coils 92—93 surround the respective pole pieces 85—86 and are wound and arranged as in Fig. 1 for vertical cut records, having circuit attachment means such as the plugs 94.

The pole end N extends appreciably below the pole end S. The armature A' is supported by a pair of springs in the manner previously described relative to Fig. 1, but in this instance while the armature is centered laterally as in Fig. 1 and provided with like lateral clearance, the center of the stylus 95' is offset laterally so as to lie nearer the pole end N than to the pole end S. A further difference between this embodiment and that of Fig. 1 is that while the armature A' is spaced below the lower extremity of S as in Fig. 1 it is always above the lower extremity of N throughout operative movement. In other words, there is relatively constant relationship as to gap space and gap area between the armature and pole end N and hence no appreciable variation in flux path; whereas there is a variation in gap space and a total absence of any gap area or overlap as between the armature and pole end S. It will be seen that vertical movement of the stylus 95' by a vertical cut record will modulate the magnetic field whose fluctuations will be transformed into corresponding alternating electrical potentials by means of the coils 92—93. This embodiment is also adapted for use on lateral cut records without change of coil connections. In such use the stylus is moved laterally, imposing a torsional force on the spring suspension and causing a rocking motion of the armature about its fore and aft axis, thus causing the end of the armature adjacent the S pole end to move toward and away from said pole end with the same result as above described. It is noted that this embodiment provides a simple and inexpensive device for universal use on both vertical and lateral cut records and also that the flux flow through the armature is unidirectional as in the embodiment of Fig. 1.

I have found that the appreciably better results are provided by a slight angular setting of the armature relative to the horizontal, while maintaining the stylus axis vertical; as more particularly pointed out following. The armature A' is disposed angularly in a clockwise direction (as viewed in Fig. 11) so that the laterally extending center line of the armature, where it intersects the vertical axis of the stylus, will define an angle of the order of 6° relative to a horizontal line passing through said intersection. This setting serves to move the armature simultaneously vertically and laterally toward or away from the pole end S when the stylus 95' is moved either vertically or laterally. It is believed that the improved results thus obtained are due to the fact that the variation in flux modulation is augmented by this angular setting because the variation in the gap distance between the pole end S and the armature A' is the useful variable, and the gap distance between the pole end N and the armature is relatively constant.

While it is preferable to offset the stylus and axial center of the spring suspension of the armature, as above described relative to Fig. 11, the stylus and axial center of the spring suspension may be symmetrically disposed as shown in Fig. 12 in which the stylus is designated 95" and the armature A". Also, while a two coil arrangement is desirable a single coil such as 92 or 93 may be used on one of the pole pieces only, but although this will produce a cheaper device it will produce only half of the voltage and lower efficiency and lose the hum-bucking advantage.

In either of the embodiment of Figs. 1–7 or Figs. 10–12, the permanent magnet which is fixed between the upper ends of the pole pieces may be dispensed with and a permanent magnet armature may be employed. Such an arrangement is shown in Fig. 13 by way of illustration and only such features will be described as are necessary for an understanding of this modification, it being understood that the device illustrated in Fig. 13 is in other respects the same as that of Fig. 1.

Referring more particularly to Fig. 13: a single pole piece 100 provides the pole branches 101—102 which are surrounded by coils 103—104 constructed and arranged as in Fig. 1. The pole branches terminate in the pole ends which are polarized by a permanent magnet armature AM as indicated by the letters N and S. While this arrangement is not as efficient as and therefore is less preferable than the devices shown in Figs. 1–7 and 10–12, it illustrates a useful embodiment of certain broad features of my invention.

In Figs. 14–15 there is shown an embodiment of certain broad features of the invention utilizing a single pole piece with a bifurcated end providing two pole ends of like polarity in accordance with the teaching of Figs. 8–9. In general, the embodiment of Figs. 14–15 is otherwise the same in structure and function and only the differences will be described with particularity. A single pole piece 110 is secured to the frame at its upper end by a screw 111, which holds it in intimate contact with a soft iron strap 112 and at its lower end by a screw 113. A permanent magnet 114 is securely held between the lower end of strap 112 and the upper end of a clamp member 115 whose lower end is secured to the frame and also serves as a part of the support for the armature 116, all in the manner previously described relative to the embodiment of Figs. 8–9.

Having thus described my invention with particularity with reference to a preferred embodiment thereof, and having referred to certain modifications, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. A sound translating device of the magnetic type comprising, a magnetic circuit providing a magnetic flux path and having a single pair of laterally spaced pole ends whose lower faces are disposed substantially on the same plane, an armature positioned for vibratile motion relative to said pole ends, said armature having a lateral width at least twice as great as its thickness in a vertical direction and said lateral width being less than the minimum lateral spacing between said pair of pole ends, a stylus rigidly secured to said armature and providing means for operative engagement with a sound record to thereby transmit motion between said armature and record, and resilient means supporting said armature in vertical register with said lateral space and urging said armature away from said pole ends with a predetermined force such that with said stylus in operative engagement with a record said armature will be disposed in said flux path and will lie with the surface of its greater width substantially parallel to said plane on which said pole faces are disposed and will be spaced downwardly from said plane.

2. A sound translating device of the magnetic type comprising, a magnetic circuit providing a magnetic flux path and having a single pair of laterally spaced pole ends whose lower faces are disposed substantially on the same plane, an armature positioned for vibratile motion relative to said pole ends, said armature having a lateral width at least twice as great as its thickness in a vertical direction and said lateral width being less than the minimum lateral spacing between said pair of pole ends, a stylus rigidly secured to said armature and providing means for operative engagement with a sound record to thereby transmit motion between said armature and record, and resilient means supporting said armature in vertical register with said lateral space and urging said armature away from said pole ends with a predetermined force such that with said stylus in operative engagement with a record said armature will be disposed in said flux field and will lie with the surface of its greater width substantially parallel to and be spaced downwardly from said plane on which said pole faces are disposed a distance at least as great as the maximum distance of operative movement of said armature toward said pole ends.

3. A sound translating device of the magnetic type comprising, a magnetic circuit providing a magnetic flux path and having a single pair of laterally spaced pole ends whose lower faces are disposed substantially on the same plane, an armature positioned for vibratile motion relative to said pole ends, said armature having a lateral width at least twice as great as its vertical thickness and said lateral width being less than the minimum lateral spacing between said pair of pole ends, a stylus rigidly secured to said armature and providing means for operative engagement with a sound record to thereby transmit motion between said armature in vertical register with said lateral space and record, and resilient means supporting said armature and urging said armature away from said pole ends with a predetermined force such that with said stylus in operative engagement with a record said armature will lie with the surface of its greater width substantially parallel to and be spaced downwardly from said plane on which said pole faces are disposed a distance substantially equal to the maximum distance of operative movement of said armature toward said pole ends.

4. A sound translating device of the magnetic type comprising, a magnetic circuit providing a magnetic flux path and having a single pair of laterally spaced pole ends whose lower faces are disposed substantially on the same plane, an armature positioned for vibratile motion relative to said pole ends, said armature having a lateral width at least twice as great as its thickness in a vertical direction, a stylus rigidly secured to said armature and providing means for operative engagement with a sound record to thereby transmit motion between said armature and record, and resilient means supporting said armature and urging said armature away from said pole ends with a predetermined force such that with said stylus in operative engagement with a record said armature will be disposed in said flux path and will lie with the surface of its greater width substantially parallel to and be spaced downwardly from said plane on which said pole faces are disposed, the maximum width of said armature being slightly less than the lateral space between said pole ends and said armature being held in vertical alignment with said space, whereby upon accidental displacement of said armature beyond its said maximum operative movement said armature will pass between said pole ends.

5. A sound translating device of the magnetic type comprising, a magnetic circuit providing a magnetic flux path and having a pair of laterally spaced pole ends whose lower faces are disposed substantially on the same plane, an armature positioned below said plane for vibratile motion relative to said pole ends, the projected area of said armature in said plane on which said pole pieces are disposed being substantially greater than the projected area of said armature in a second plane normal to said first mentioned plane and being less than the minimum lateral spacing between said pole ends and in register with said space a stylus rigidly secured to said armature and providing means for operative engagement with a sound record to thereby transmit motion between said armature and record, and resilient means supporting said armature, said resilient supporting means providing a degree of compliance such that the unbalanced weight of said device when said stylus rests on said record plus the magnetic attraction of said armature toward said pole ends provides a position of neutral equilibrium at which said armature is disposed beneath the plane on which said pole faces lie a distance substantially equal to the maximum distance of operative movement of said armature toward said pole ends.

6. A sound translating device of the magnetic type comprising, a magnetic circuit providing a magnetic flux path and having a pair of pole ends of opposite polarity spaced apart laterally in a direction parallel to said flux path through the remainder of said magnetic circuit, said pole ends having lower faces disposed substantially on the same plane, an armature positioned for vibratile motion relative to said pole ends and having a lateral width less than the lateral spacing between said pole ends and being in register with said space, a stylus rigidly secured to said armature and providing means for operative engagement with a sound record to thereby transmit motion between said armature and record, and resilient means supporting said armature and urging said armature away from said pole ends with a predetermined force such that with said stylus in operative engagement with a record said armature will lie substantially parallel to said plane on which said pole faces are disposed and will be spaced downwardly from said plane.

7. A sound translating device of the magnetic type comprising, a magnetic circuit providing a magnetic flux path and having a pair of laterally spaced pole pieces of opposite polarity whose lower faces are disposed substantially on the same plane, an armature positioned for vibratile motion relative to said pole pieces, a stylus rigidly secured to said armature and providing means for operative engagement with a sound record to thereby transmit motion between said armature and record, resilient means supporting said armature and urging said armature away from said pole pieces with a predetermined force such that with said stylus in operature engagement with a record said armature will lie substantially parallel to said plane on which said pole faces are disposed and will be spaced downwardly from said plane, said armature having a lateral width less than the minimum space between said laterally spaced pole ends and being supported in register with said space, said armature being movable bodily toward said pole faces responsive to movement of said stylus by sound track undulations of a vertical cut record and being rotatably movable to a limited extent responsive to ancillary lateral undulations of said record, and electrical coils surrounding respective of said pole pieces and arranged and connected so as to produce currents in phase for vertical movement and out of phase for lateral movement of said armature.

8. A sound translating device of the magnetic type comprising, a magnetic circuit providing a magnetic flux path and having a pair of laterally spaced pole pieces of opposite polarity whose lower faces are disposed substantially on the same plane, an armature having a lateral extent less than the minimum lateral space between said pole ends positioned for vibratile motion relative to said pole pieces, a stylus rigidly secured to said armature and providing means for operative engagement with a sound record to thereby transmit motion between said armature and record, resilient means supporting said armature in register with said lateral space and urging said armature away from said pole pieces with a predetermined force such that with said stylus in operative engagement with a record said armature will lie substantially parallel to said plane on which said pole faces are disposed and will be spaced downwardly from said plane, said armature being movable toward said pole faces responsive to movement of said stylus by sound track undulations of a vertical cut record, and electrical coils surrounding respective of said pole pieces and arranged and connected so as to produce currents in phase for said armature movement and out of phase for extraneous magnetic fields.

9. A sound translating device comprising, a magnetic circuit providing a magnetic flux field and having pole pieces terminating in laterally spaced ends, an armature disposed for operative movement within said field and provided with a mechanical motion translating element rigidly secured thereto for movement therewith, said armature having a lateral width at least twice as great as its vertical thickness and less than the space between the innermost extremities of said laterally spaced pole ends, spring means supporting said armature with its width disposed substantially horizontally and in register with said space, said spring means providing a degree of compliance such that when said device is in operative position said spring supporting means is deflected by a predetermined load and said armature is disposed in neutral position spaced away from said pole ends a distance substantially no greater than the travel of said armature toward said poles in accordance with the displacement of said mechanical motion translating element when moved through the maximum amplitude of operation.

10. A sound translating device comprising, a magnetic circuit providing a magnetic flux field and having pole pieces terminating in laterally spaced ends whose lower faces are defined by a substantially horizontal plane, an armature disposed for operative movement within said field and provided with a mechanical motion translating element rigidly secured thereto for movement therewith, said armature having a lateral width at least twice as great as its vertical thickness and less than the space between the innermost extremities of said laterally spaced pole ends, and spring means supporting said armature with its width disposed substantially horizontally and in register with said space, said armature and spring means providing a degree of compliance such that when in operative position said spring supporting means is deflected by a predetermined load and said armature is disposed in neutral position spaced away from said plane a distance substantially equal to the travel of said armature toward said poles in accordance with the displacement of said mechanical motion translating element when moved through the maximum amplitude of operation.

11. A sound translating device of the magnetic type comprising, a magnetic circuit providing a flux path and having a pair of laterally spaced pole ends of the same polarity whose lower faces are disposed substantially in the same plane and a pole piece of opposite polarity terminating in spaced relation relative to said pair of pole ends, an armature positioned for vibratile motion in said flux path, a stylus secured to said armature and providing means for operative engagement with a sound record to thereby transmit motion between said armature and record, resilient means supporting said armature, said armature being of less lateral extent than the lateral space between said pair of pole ends and said resilient means centering said armature laterally with respect to said pair of pole ends and urging said armature away from said pole ends with such force that when said stylus is in operative position on a record said armature is spaced below said pair of pole ends a distance greater than the maximum movement of said armature toward said ends when vibrating at its maximum amplitude throughout the audible frequency range.

12. A sound translating device of the magnetic type comprising, a magnetic circuit having poles providing a pair of laterally spaced pole ends associated with an air gap forming a portion of the flux path of said magnetic circuit, the flux flow across said gap being parallel to a flux path coaxial with said pole ends an armature of less lateral width than the lateral space between the innermost extremities of said pole ends disposed in said flux path and provided with a mechanical motion translating element rigidly secured thereto for movement therewith, resilient mounting means supporting said armature with its laterally oppositely disposed ends spaced laterally inwardly from respective of said pair of pole ends and spaced relatively vertically below at least one of said pole ends, said resilient mounting means providing a degree of compliance such that when said device is in operative position and said armature is moved through its maximum amplitude its maximum lateral and vertical movements do not exceed its respective lateral and vertical spacing, and electrical generating coil means surrounding at least one of said poles.

13. A sound translating device of the magnetic type comprising, a magnetic circuit having poles providing a pair of laterally spaced pole ends associated with an air gap forming a portion of the flux path of said magnetic circuit, an armature disposed in said flux path and provided with a mechanical motion translating element rigidly secured thereto for movement therewith, said armature having a lateral width at least twice as great as its vertical thickness and less than the lateral space between the innermost extremities of said pole ends resilient mounting means supporting said armature with its laterally oppositely disposed ends spaced laterally inwardly from the innermost extremities of respective of said pair of pole ends a distance of the order of .0005"–.001" and spaced relatively vertically a distance of the order of .001"–.008" from the lower extremity of at least one of said pole ends, said armature mounting means providing a degree of compliance such that when said device is in operative position and said armature is moved through its maximum amplitude its maximum lateral and vertical movements do not exceed its respective lateral and vertical spacing, and electrical generating coil means surrounding at least one of said poles.

14. A sound translating device of the magnetic type comprising, a magnetic circuit having pole means, a pair of laterally spaced pole ends associated with an air gap forming a portion of the flux path of said magnetic circuit, an armature disposed in said flux path and provided with a mechanical motion translating element rigidly secured thereto for movement therewith, said armature having a lateral width at least twice as great as its vertical thickness and less than the lateral space between the innermost extremities of said pole ends resilient mounting means supporting said armature with its laterally oppositely disposed ends spaced laterally inwardly from the innermost extremities of respective of said pair of pole ends and spaced relatively vertically from the lower extremity of said pair of pole ends, said armature mounting means providing a degree of compliance such that when said device is in operative position and said armature is moved through its maximum amplitude its maximum lateral and vertical movements do not exceed its respective lateral and vertical spacing, and electrical generating coil means surrounding a portion of said pole means.

15. A sound translating device of the magnetic type comprising, a magnetic circuit having poles providing a pair of laterally spaced pole ends of opposite polarity associated with an air gap forming a portion of the flux path of said magnetic circuit, an armature disposed in said flux path and provided with a mechanical motion translating element rigidly secured thereto for movement therewith, said armature having a lateral width at least twice as great as its vertical thickness and less than the space between the innermost extremities of said laterally spaced pole ends, resilient mounting means supporting said armature with its laterally oppositely disposed ends spaced laterally inwardly from the innermost extremities of respective of said pair of pole ends and spaced relatively vertically from the lower extremity of said pair of pole ends, said armature mounting means providing a degree of compliance such that when said device is in operative position and said armature is moved through its maximum amplitude its maximum lateral and vertical movements do not exceed its respective lateral and vertical spacing, and electrical generating coils surrounding respective of said poles.

16. A sound translating device of the magnetic type comprising, a magnetic circuit having spaced apart pole tips through which magnetic flux flows across an armature field, an armature having a maximum lateral width less than the space between said tips and being in vertical alignment with said space and disposed in said field and provided with a mechanical motion translating element rigidly secured thereto, said armature having a lateral width at least twice as great as its vertical thickness and less than the space between the innermost extremities of said pole tips resilient mounting means supporting said armature substantially equidistantly spaced from said tips when in operative neutral position and providing for vertical and rocking motion of said armature, said armature mounting means providing a degree of compliance such that vertical movement of said element simultaneously increases or decreases the space between said armature and both of said tips and lateral movement of said element simultaneously increases the said space between said armature and one of said tips while decreasing the space between said armature and the other said tip.

17. A sound translating device of the magnetic type comprising, a magnetic circuit having pole members providing a pair of laterally spaced pole ends associated with an air gap forming a portion of the flux path of said magnetic circuit, one of said pole ends extending downwardly below the other, an armature having a maximum width less than the lateral space between the innermost extremities of said pole ends disposed in said flux path and provided with a mechanical motion translating element rigidly secured thereto for movement therewith, resilient mounting means supporting said armature with its laterally oppositely disposed ends spaced laterally from respective of said pair of pole ends, said armature mounting means providing a degree of compliance such that when said device is in operative position said armature is disposed in a relative vertical direction above the lower extremity of the lowermost pole end in vertical overlapping relationship therewith and below the uppermost pole end in vertically spaced relationship therewith and when said armature is moved through its maximum amplitude its maximum lateral movement does not exceed its lateral spacing and its vertical movement does not exceed its vertical spacing with respect to the said uppermost pole end nor vary its overlap with respect to said lowermost pole end, and electrical generating coil means surrounding at least one of said pole members.

18. In a sound translating device of the magnetic type, the combination of a magnet circuit comprising pole members having spaced pole ends providing a magnetic field, said pole ends being disposed on laterally opposite sides of the center line of said magnetic circuit to provide a flux flow across said space in a direction parallel to a coaxial flux path through said pole ends, an armature having a maximum width less than the lateral space between the innermost extremities of said pole ends and in vertical alignment with said space and being disposed in said field and provided with a mechanical motion translating element rigidly secured thereto for movement therewith, stationary electrical coil means surrounding a part of said magnetic circuit, and spring means supporting said armature and providing a degree of compliance such that when in operative position said spring supporting means is deflected by said armature and said armature is in neutral position spaced from said pole ends an amount substantially no greater than the travel of said armature toward said poles which will be imposed upon said armature by the displacement of said mechanical motion translating element when said element is moved through the maximum amplitude of operation.

19. A sound translating device comprising, a magnetic circuit providing a magnetic flux field and having pole pieces terminating in laterally spaced ends, said pole ends being disposed on laterally opposite sides of the center line of said magnetic circuit to provide a flux flow across said space in a direction parallel to a coaxial flux path through said pole ends, an armature having a maximum width less than the lateral space between the innermost extremities of said pole ends and in vertical alignment with said space and being disposed for operative movement within said field and provided with a mechanical motion translating stylus rigidly secured thereto for movement therewith, said armature being urged toward said ends by flux flow therebetween and said armature when moved in accordance with the motion of said stylus serving to modulate the flux flow, and spring means supporting said armature, said spring in operative position being flexed toward said pole pieces under the unbalanced weight of said device and the said magnetic pull on said armature, whereby the flexing load on said spring is increased without increasing the weight on said stylus, said armature spring means providing a degree of compliance such that when said device is in operative position said spring supporting means is deflected by said load and said armature is disposed in neutral position spaced away from said pole ends a distance substantially no greater than the travel of said armature toward said poles in accordance with the displacement of said mechanical motion translating element when moved through the maximum amplitude of operation.

20. A sound translating device of the magnetic type comprising, a magnetic circuit having pole members providing a pair of laterally spaced pole ends associated with an air gap forming a portion of the flux path of said magnetic circuit, one of said pole ends extending downwardly below the other, an armature having a maximum width less than the lateral space between the innermost extremities of said pole ends disposed in said flux path and provided with a mechanical motion translating element rigidly secured thereto for movement therewith, resilient mounting means supporting said armature with its laterally oppositely disposed ends spaced laterally from respective of said pair of pole ends and in such relationship therewith that when said device is in operative position one end of said armature is disposed in a relative vertical direction above the lower extremity of the lowermost pole end in vertical overlapping relationship therewith and the other end is disposed below the uppermost pole end in vertically spaced relationship therewith and when said armature is moved its vertical and lateral spacings relative to said lower end are simultaneously varied.

21. A sound translating device of the magnetic type comprising, a magnetic circuit having pole members providing a pair of laterally spaced pole ends associated with an air gap forming a portion of the flux path of said magnetic circuit, one of said pole ends extending downwardly below the other, an armature having a maximum width less than the lateral space between the innermost extremities of said pole ends disposed in said flux path and provided with a mechanical motion translating element rigidly secured thereto for movement therewith, resilient mounting means supporting said armature for vertical and rocking motion about an axis of rotation offset laterally from the center of said gap toward said downwardly extending pole end and with its laterally oppositely disposed ends spaced laterally from respective of said pair of pole ends and in such relationship therewith that when said device is in operative position said armature is disposed in a relative vertical direction above the lower extremity of the lowermost pole end in vertical overlapping relationship therewith and below the uppermost pole end in vertically spaced relationship therewith and when said armature is moved through its maximum amplitude its maximum lateral movement does not exceed its lateral spacing and its vertical movement does not exceed its vertical spacing with respect to the said uppermost pole end nor vary its overlap with respect to said lowermost pole end, and electrical generating coil means surrounding at least one of said pole members.

22. A sound translation device of the magnetic type comprising, a magnetic circuit providing a magnetic flux path and having a pair of laterally spaced pole ends, an armature having a lateral extent less than the lateral space between said pole ends and being positioned in register with said space for vibratile motion relative to said pole ends, a stylus rigidly secured to said armature and providing means for operative engagement with a sound record to thereby transmit motion between said armature and record, resilient means supporting said armature and urging said armature away from said pole ends with a predetermined force such that with said stylus in operative engagement with a record said armature will be disposed in said flux path, a highly resilient pad disposed between said pole ends and between the upper face of said armataure and the lower face of an upwardly spaced relatively stationary part of said device, and means for adjusting said pad to vary by small increments the resistance to movement of said armature in an upward direction toward said pole ends.

LIONEL B. CORNWELL.

REFERENCES CITED

The following references are of record in the file of this patent:

UNITED STATES PATENTS

| Number | Name | Date |
| --- | --- | --- |
| 1,756,966 | Alden | May 6, 1930 |
| 1,804,961 | Thomas | May 12, 1931 |
| 2,110,092 | Norton et al. | Mar. 1, 1938 |
| 2,173,051 | De Madaler et al. | Sept. 12, 1939 |
| 2,238,863 | Norton | Apr. 15, 1941 |

Certificate of Correction

Patent No. 2,485,432                                                                     October 18, 1949

LIONEL B. CORNWELL

It is hereby certified that errors appear in the printed specification of the above numbered patent requiring correction as follows:

Column 9, lines 35 and 36, strike out the words "in vertical register with said lateral space" and insert the same after "armature" and before "and" in line 37;

and that the said Letters Patent should be read with these corrections therein that the same may conform to the record of the case in the Patent Office.

Signed and sealed this 13th day of June, A. D. 1950.

[SEAL]

THOMAS F. MURPHY,
*Assistant Commissioner of Patents.*